United States Patent [19]

Hill, Jr.

[11] 4,143,814
[45] Mar. 13, 1979

[54] CONTROL AND TRANSFER OF ENERGY

[75] Inventor: John A. Hill, Jr., Sherborn, Mass.

[73] Assignee: Ultimate Engineering Corporation, Natick, Mass.

[21] Appl. No.: 721,496

[22] Filed: Sep. 8, 1976

[51] Int. Cl.² ............................................. F24J 3/02
[52] U.S. Cl. ................................. 237/1 A; 237/8 R; 126/271
[58] Field of Search ............. 237/1 A, 8 R; 236/1 G; 126/271, 400; 219/279, 282, 341, 365, 378

[56] References Cited

U.S. PATENT DOCUMENTS

| | | | |
|---|---|---|---|
| 1,122,989 | 12/1914 | Newkumet | 219/279 |
| 1,888,620 | 11/1932 | Clark | 126/271 |
| 3,341,122 | 9/1967 | Whittell, Jr. | 237/8 R |
| 3,896,992 | 7/1975 | Borovina et al. | 237/8 R |
| 3,934,796 | 1/1976 | Smith, Jr. et al. | 236/16 |
| 3,960,136 | 6/1976 | Moan et al. | 237/1 A |
| 3,977,601 | 8/1976 | Bearzi | 237/1 A |
| 3,980,071 | 9/1976 | Barber, Jr. | 237/1 A |
| 4,004,573 | 1/1977 | Frieling et al. | 237/1 A |
| 4,007,776 | 2/1977 | Alkasab | 237/1 A |
| 4,010,734 | 3/1977 | Chayet | 237/1 A |

OTHER PUBLICATIONS

Baseline Solar Collector by Glass Division/PPG Technical Services, p. 3.

Primary Examiner—Henry C. Yuen
Attorney, Agent, or Firm—George E. Kersey

[57] ABSTRACT

A system for the efficient control and transfer of energy from a multiplicity of different sources, such as the sun and fossil fuels, using a heat exchanger and various storage units. When solar energy is available, it is transformed and used or stored. When it is insufficient, fossil fuel is used to operate a boiler heat exchanger and meet system requirements.

12 Claims, 4 Drawing Figures

CONTROL AND TRANSFER OF ENERGY

BACKGROUND OF THE INVENTION

This invention relates to the control and transfer of energy, and, more particularly, to the efficient control and transfer of energy from solar and fossil sources.

Energy is available from a variety of different sources, but the extent of the availability, and its cost, are variables. The solar energy that is plentiful on a hot summer day ceases to be available in the evening. Residual crude oil which was once plentiful, is now in short supply at comparatively high cost. Other fuel sources are variously available according to existing political and economic conditions.

Accordingly, it is an object of the invention to provide for the use of energy from alternative sources. Another object is to make efficient use of energy from a multiplicity of sources.

One of the most important sources of energy has been the sun. Solar energy not only is often available in great amounts, it usually is at the doorstep of the potential user, and it is not subject to the same kinds of economic and political restrictions often found with other energy sources. The difficulty is that the sun is not always available.

Accordingly, it is a further object of the invention to make use of solar energy, without complete reliance on it. A related object is to integrate solar energy into an overall energy system.

A common and widespread use of energy has been for industrial and household temperature control of air and water. Attempts have been made to use solar heating for one or both of those purposes with limited success.

One approach has been to use parallel systems. When the solar system failed or was out of operation, a coexisting fossil fuel system was employed. Aside from the needless duplication of equipment, such a system is wasteful of fuel and inefficient.

Another approach has been to use solar energy to heat water in a storage tank, with the water pumped from storage to one or more auxiliary heaters, e.g., one for heating and another one for hot water supply. This procedure fails to make efficient use of the solar energy and does not satisfy the usual priorities imposed on a heating system. There is even less efficiency if the storage tank is heated by fossil energy.

Accordingly, it is an object of the invention to make efficient use of solar energy. A related object is to make efficient use of solar energy in a system employing one or more alternative energy sources.

Another object of the invention is to avoid the unnecessary dissipation of solar energy. A related object is to organize a heating system in a way which enhances the solar heating effect.

A further object of the invention is to coordinate solar heating with heating from other sources to provide a desired overall result.

Still another object is to employ solar heating in a system which is nevertheless able to satisfy the usual priorities of a modern heating system.

SUMMARY OF THE INVENTION

In accomplishing the foregoing and related objects, the invention provides for the integration of different energy sources into an overall system in which each source supplements the other. This is accomplished by the use of a heat exchanger which is energizable by the various sources, together with one or more storage tanks to which energy can be transferred from the heat exchanger.

In accordance with one aspect of the invention one of the energy sources for the exchanger is a closed loop of fluid that is heated by solar radiation. Provision is made for the radiation of excess energy from the loop.

In accordance with another aspect of the invention, another of the energy sources for the exchanger makes use of fossil fuel, and the exchanger takes the form of a boiler.

In accordance with a further aspect of the invention, the loop of solar heated fluid is connected to the heat exchanger by coils which provide parallel paths to lower the resistance to flow of the fluid.

In accordance with still another aspect of the invention, the boiler has a motorized, failsafe damper to limit the dissipation of the solar energy being applied to the exchanger.

In accordance with still further an aspect of the invention, utilization of the transferred energy is made either at the output of the storage tank or in the transfer path.

In accordance with yet another aspect of the invention, the primary energy requirements are satisfied by the heat exchanger from the fossil fuel source, but the secondary requirements are satisfied either from the solar energy source of the storage tanks.

In operation, the system operates in accordance with a set of priorities so that the highest priority is for hot water which is heated by the fossil fuel source and withdrawn from the system. This is followed by the heating of water by fossil fuel for circulation in the system. The third priority is for the heating of water for withdrawal or circulation by the solar energy source, and the transfer of energy from the solar source to storage. Any excess solar energy is dissipated into the atmosphere.

DESCRIPTION OF THE DRAWINGS

Other aspects of the invention will become apparent after considering several illustrative embodiments taken in conjunction with the drawings in which.

DETAILED DESCRIPTION

Figure 1:
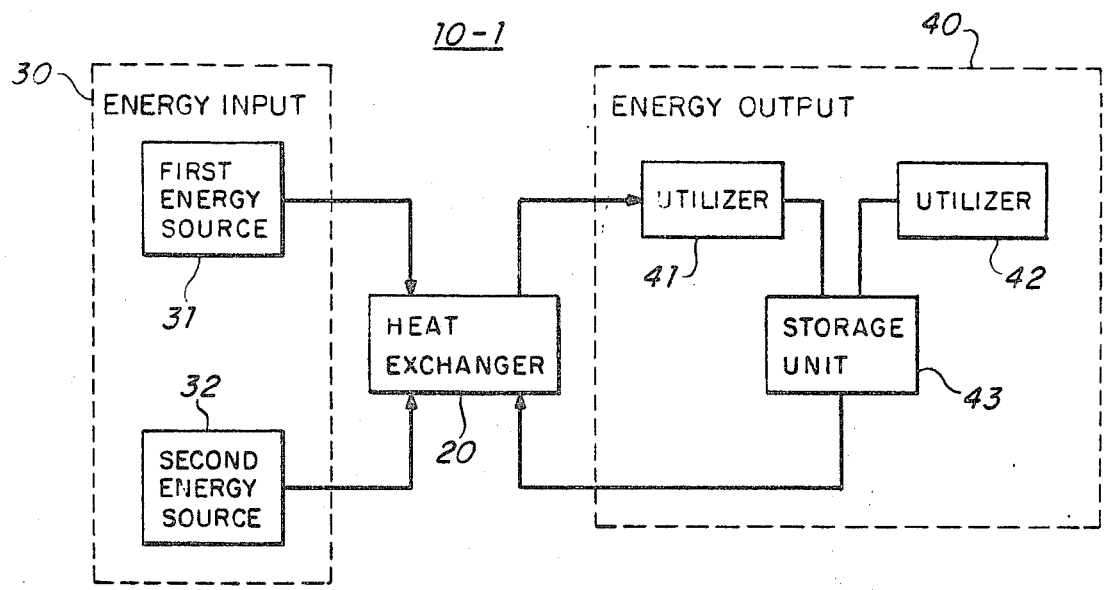
FIG. 1 is a block and schematic diagram of an energy control and transfer system in accordance with the invention.
Figure 2:
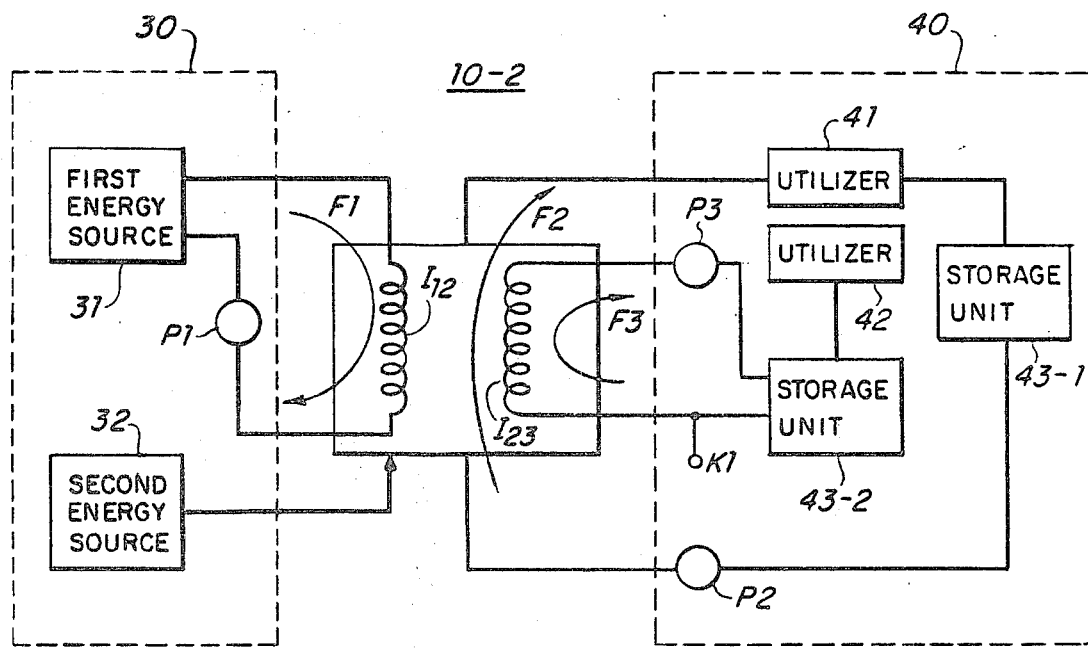
FIG. 2 is a block and schematic diagram of a modification of the system of FIG. 1.
Figure 3:
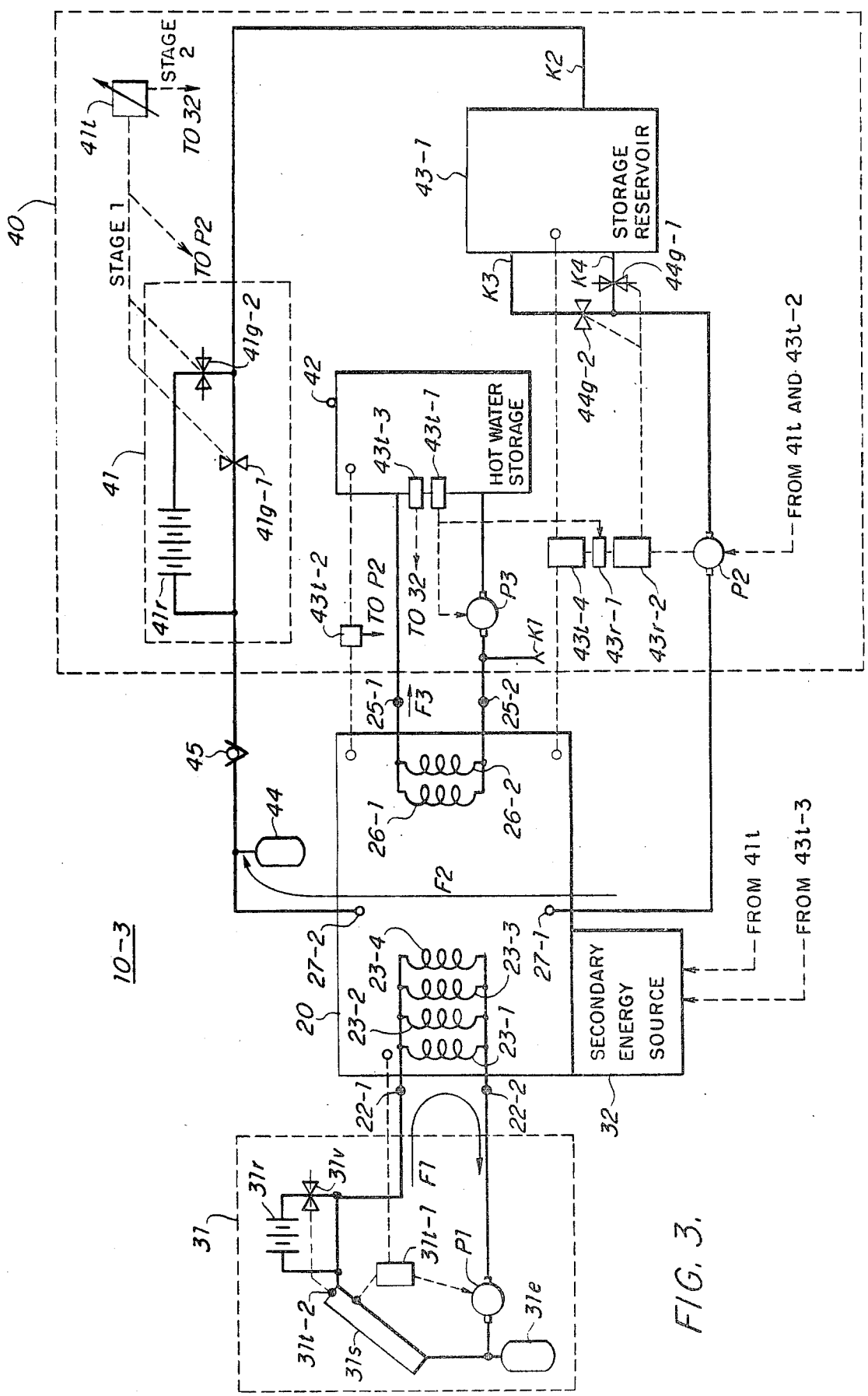
FIG. 3 is a block and schematic diagram of solar and fossil fuel system in accordance with FIG. 2.

Turning to the drawings, energy control and transfer systems in accordance with the invention are depicted in FIGS. 1 through 3.

In FIG. 1, a first system 10-1 is shown with a central component in the form of a heat exchanger 20. The exchanger advantageously has a minimum storage capacity consistant with providing suitable heat exchange. The reason that a limited storage capacity is desired is that the exchanger 20 functions primarily as a unit for the efficient transfer of energy between an input 30 and an output 40, and storage is incidental. It is particularly important for the storage capacity of the exchanger 20 to be minimal consistant with efficient heat exchange in order to facilitate rapid temperature control. This rapid response is needed in order to minimize the use of energy sources in an inefficient and and undesired overlap fashion.

As indicated in FIG. 1, the input 30 contains at least two energy sources 31 and 32. This permits energy to be transferred to the output 40 from one source, e.g., unit 31, or the other, e.g., unit 32, according to a predetermined set of priorities. In particular, the invention assures the efficient use of intermittently available sources, such as solar energy, and also assures specified priorities, such as the availability of suitable quantities of domestic or service hot water on demand. Domestic or service hot water refers to heated water that is drawn off independently of space heating requirements.

The output 40 includes a storage unit 43 and an energy utilizer 41. The latter illustratively is connected in a loop formed between the heat exchanger 20 and the storage unit 43. In addition a second energy utilizer 42 is shown for receiving energy directly from the storage unit 43.

In an illustrative application of the system 10-1, the first energy source 31 is a solar heating unit and the second energy source 32 is a fossil fuel burner. The heat exchanger 20 is able to receive heat from either the solar unit 31 or the burner 32 and transfer it to the storage unit 43. Some of the transfer energy may be extracted by the utilizer 41 while in transit to the storage unit 43, or previously transferred energy may be pumped to one or both of the utilizers 41 and 42.

An adaptation of the energy system of FIG. 1 for use where the transfer medium is a fluid is set forth in FIG. 2 showing a second system 10-2.

As indicated in FIG. 2 the system 10-2 has three loops with respective fluids F1, F2 and F3. The first fluid F1 is circulated by a pump P1 within the first loop from the first source 31, illustratively a solar heating unit, to the heat exchanger 20. The second fluid F2 can be circulated by a pump P2 in the second loop from the heat exchanger 20 to a first storage unit 43-1. Thus energy may be transferred from the solar unit 31 by the fluid F1 to the fluid F2 at an interface $I_{12}$, and then transferred by pumping to the first storage unit 43-1.

Or the energy may be transferred with the pump P2 in the second loop inactive, from the first fluid F1 through the second fluid F2 to the third fluid F3 at an interface $I_{23}$, and then circulated by a pump P3 to a second storage unit 43-2.

When the loop of the fluid F2 is active, the flow of energy can be through a utilizer 41. The residual energy remaining in the second fluid F2 is carried to the first storage unit 43-1. The utilizer 41 may be in the form of radiators connected in series with the storage unit 43-1. It will be apparent that the utilizer 41 may be bypassed when it is desired to transfer all of the energy of the second fluid F2 to storage for later use. Since the energy being transferred in the loop of the second fluid F2 has a fluid carrier, it is desirable for the storage unit 43-1 to be a fluid reservoir.

It is to be noted that the loop of the second fluid F2 is closed but the loop of the third fluid F3 is open, so that the fluid may be added to it at any time at an input point K1.

The open loop of the third fluid F3 is used, for example, where the utilizer 42 is coupled to the second storage unit 43-2 to provide a source of hot water. In that case, water to be heated is applied at the input K1 and circulated into the exchanger 20 where energy can be transferred to the fluid carrier F3 from either the solar source 31 or the second source 32. After the transfer has taken place the fluid carrier is pumped to the second storage unit 43-2 and drawn off at the utilizer 42 as needed.

The second energy source 32 of FIG. 2 desirably provides direct heating at the heat exchanger 20 and can take the form of a fossil fuel burner.

The use of the invention is an illustrative heating and hot water system is illustrated in FIG. 3 by the system 10-3. The preferred energy source 31 is a solar energy loop which includes solar panels 31s and heat exchange coils 21-1 through 21-4 in the heat exchanger 20.

The loop contains a fluid F1 which can be heated by the panels 31s. Since the solar panels 31s can also be exposed to other environmental effects, such as the cold weather, the fluid F1 also includes a suitable amount of antifreeze.

When a differential thermostat 31t-1 senses that the temperature of the carrier liquid F1 in the exchanger 20 is less than in the solar loop, it causes the pump P1 to move the fluid F1 from the solar panels 31s to the coils 21-1 through 21-4. Each of the coils is illustratively a finned copper tube formed into a spiral. The flow of the carrier fluid F1 continues until it has the same temperature as the fluid F2 in the exchanger. A suitable differential thermostat is that provided by the Model 02A of the del Sol Controls Company of Juno, Florida.

If the temperature sensed at the solar panels 31s by an aquastat 31t-2 becomes too great a motorized valve 31v is opened to divert the fluid F1 through an auxiliary radiator 31r. A suitable valve is of the kind supplied by the Flair Manufacturing Corp. of Hauppauge, L.I., N.Y. The aquastat is an ordinary fluid sensing thermostat. The loop of the solar heated fluid F1 also includes an expansion tank of the diaphragm pressurized type supplied by Amtrol Inc. of West Warwick, Rhode Island.

Heat from the preferred source 31 can be transferred to the output 40 in a number of ways. If the temperature monitored by an aquastat sensor 43t-1 at the second reservoir or storage unit 43-2 is below a set level, the sensor actuates a pump P3 to force fluid F3 into coils 26-1 and 26-2, of the exchanger 20. If the fluid F2 in the exchanger 20 is at a higher temperature than the fluid F3 forced into the coils 26-1 and 26-2, there will be a transfer of energy to the second storage unit 43-2.

On the other hand, if the fluid F2 in the exchanger 20 is at a lower temperature than the fluid F3, the differential thermostat 43t-2 operates the pump P2 to draw heated fluid from a comparatively large storage reservoir 43-1. A further control (not shown) can be included to permit operation of the pump P2 by the thermostat 43t-2 only if the temperature in the unit 43-1 is greater than that in the hot water unit 43-2.

In any event, if the temperature in the unit 43-2, as measured by an aquastat sensor 43t-3, falls below a prescribed level, indicating neither solar energy nor previously stored energy is available, the secondary energy source 32 is operated.

If there is no demand for heat in the unit 43-2, as sensed, for example, by the aquastat 43t-1, which operates a relay 43r-1 that is normally closed electrically, and if the temperature sensed by a differential thermostat 43t-4 at the median level in the first reservoir 43-1 is below that at the exchanger 20, the thermostat operates the pump P2 through a relay 43r-2 to circulate the fluid F2 into the reservoir 43-1. If the relay 43r-1 is not used, the loop containing the hot water fluid F3 and the heating loop with the fluid F2 can operate simultaneously.

The fluid F2 is cushioned by a unit 44, similar to the unit 31e, and goes into a utilizer 41 through a check valve 45 which prevents gravity circulation when the pump P2 is not operating.

If there is no demand for heat, the flow is through the normally open motorized valve 41g-1. Otherwise, if a thermostat 41t indicates that the temperature is below that desired, a transfer takes place with the normally open motorized valve 41g-1 closed and the normally closed motorized valve 41g-2 open. Coupled with operation of the pump P2, this causes the fluid F2 to circulate through the radiator 41r. Any residual heat carried by the fluid F2 passes into the reservoir 43-1.

It is to be noted with respect to the first reservoir 43-1 that the normal flow of the fluid is into the base of the reservoir at an inlet point K2 in a generally laminar and non-turbulent fashion, with the normal outflow at an elevated outlet K3. However, when energy is to be transferred into storage, a relay 43r-2 is operated by the sensor 43t-4 to close the normally open motorized valve 44g-2 and open the normally closed motorized valve 44g-1. In this way the lower temperature fluid in the reservoir 43-1 is drawn off in laminar fashion to be replaced by the higher energy increments that have been obtained by heat exchange. This is by contrast with the usual situation where the flow takes place through the outlet K3 in order that the highest temperature fluid will be available for circulation in the system.

Accordingly, it is seen that the system 10-3 of FIG. 3 operates in accordance with a set of priorities. The highest priority is for service hot water which is drawn from the second reservoir 43-2 by operating a utilizer valve 42. The temperature of the fluid F3 is maintained at the desired level using solar energy, if available, and if not, from the storage reservoir; otherwise from the secondary source 32. Because of the coordination of the energy sources provided by the invention, efficient use is made of solar and stored energy in satisfying any priority demand for hot water.

A second priority in the system can be the heating of water for circulation in radiators and other heating elements. If there is no demand for energy transfer to the water storage tank 43-2, and if the temperature at the exchanger 20 is greater than at the reservoir 43-1, indicating the availability of solar energy, the fluid F2 is circulated to the reservoir 43-1. Simultaneously, the thermostat 41t may operate to permit energy transfer to the radiators 41r.

However, if the demand for heat is not satisfied, either because there is insufficient heat transfer, or because a large increment of heat is desired, the secondary energy source 32 is operated. For that purpose the thermostat 41t contains a second stage which operates the source 32, either because the heat level has fallen sufficiently below the level of the first stage or because the user has set the thermostat for a large incremental demand for heat that cannot be satisfied by the first stage. If it is desired to satisfy the hot water requirements before heating, a relay (not shown) similar to the normally electrically open relay 43r-1 is inserted into the electrical path from the second stage of the thermostat 41t to the secondary source 32 and controlled by the hot water thermostat 43t-1. A suitable two-stage thermostat is the model T872F1019 supplied by the Honeywell Company of Minneapolis, Minn.

Figure 4:
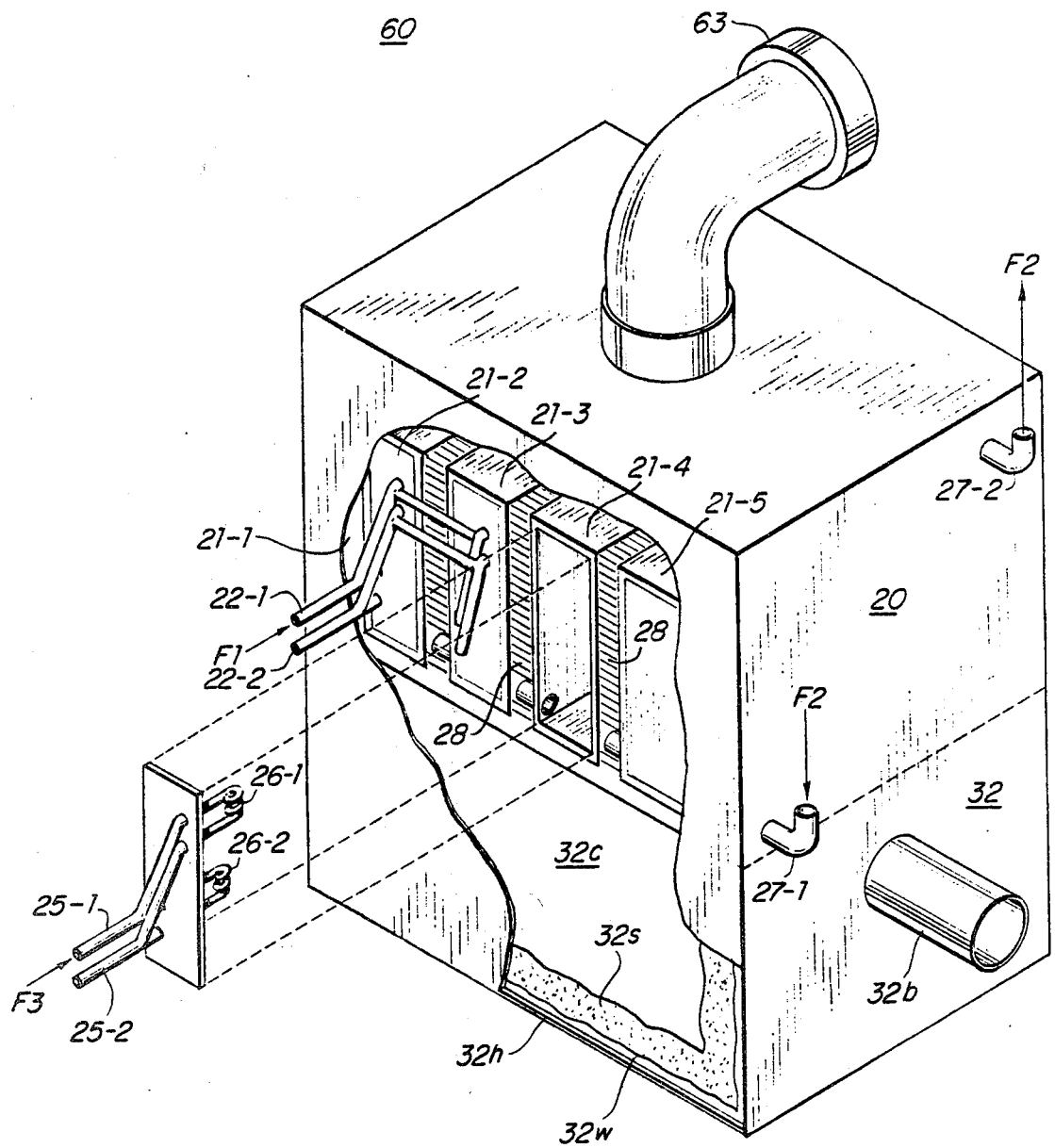
FIG. 4 is a perspective view of a heat exchanger in accordance with the invention for the system of FIG. 3.

A boiler heat exchanger 60 for the system 10-3 of FIG. 3 is shown in FIG. 4. The unit 60 is formed by two sections; a heat exchanger 20 in the form of a boiler block and a source 32 for the conversion of fuel to heat the boiler block. In the unit 60, the exchanger 20 and the source 32 are in immediate proximity to one another to eliminate unnecessary and thermally wasteful linkages between them.

The source 32 of FIG. 4 includes a chamber 32c for the combustion of fossil fuel, for example oil, by a burner 32b. The burner 32b is sized to match the exchanger 20 and is provided with flame retention to conserve energy and produce minimal pollution.

In an illustrative embodiment of the invention, the burner 32b was a Beckett Flame Retention type with a capacity of 1.3 gallons of oil per hour, producing 131.3 kiloBTU per hour. For maximum economy the nozzle for the burner was selected for 1 gallon per hour with an output of 101.7 kiloBTU per hour based on a piping and pick up allowance of 1.5. The combustion chamber 32c is advantageously lined with alumina silica 32s to withstand a temperature of 2300° F., with a mineral wool blanket 32w between the silica and the housing 32h.

The exchanger portion 20 is a block of sections 21, of which selected sections have tankless coils. In the particular embodiment of FIG. 4, there are five cast-iron sections 21-1 through 21-5, with each of three intermediate sections 21-2 through 21-4 having two tankless coils. The boiler block has narrow flue passages to provide significant turbulence to the flue gases and appreciable scrubbing against the heating surfaces. Pins 28 extending into the flue passages assist in the absorption of heat down to a stack temperature of 400° F. or less.

The sections 21-1 through 21-5 are coupled together in standard fashion through push nippls so that the fluid F2 (FIG. 3) can enter the port 27-1, internally wet the sections 21-1 through 21-5 and flow from the exchanger through an exit port 27-2.

It is to be noted that since each of the interior sections 21-2 through 21-4 has two tankless coils, two sections 21-2 and 21-3 are used for the solar loop coils 23-1 through 23-4 of FIG. 3. These coils are connected in parallel to input and exit ports 22-1 and 22-2. Four coils are used to lower the resistance to the flow of the solar heated fluid F1 in the exchanger 20.

The remaining two coils 26-1 and 26-2 are also connected in parallel and are used for the service hot water fluid F3 at inlet and exit ports 25-1 and 25-2.

The boiler exchanger 60 is also provided with a motorized damper 63. During the heat exchange of solar energy by the fluid F1, the flue is closed by the damper 63 to prevent heat loss. When the source 32 operates, the damper is held open. In particular the damper is made fail-safe by being balanced to open (and remain open) when power is removed. In addition, the damper contains a switch to disable the burner when the damper is closed, as well as a delay switch which prevents closure until after a suitable delay interval to allow for sufficient cooling of the burner parts. A suitable fail-safe damper 63 is available from the Flair Manufacturning Corp. of Hauppauge, L.I., N.Y.

In a test embodiment of the invention, the pump P1 for the solar loop was a March model 809 with a maximum capacity of 6 gallons per minute; the pump P3 was also a March model 809 with a 3 gallon per minute capacity. The heating pump P2 was a Sunstrand Model L with a maximum capacity of 27 gallons per minute.

In general, for efficient operation it is desirable for the capacity of the pump P1 to be less (about one-half) of the capacity of the pump P3, which in turn is less (about one-fourth) of the capacity of the pump P2.

Similarly it is desirable for the resistance to flow of the service fluid F3 to be less (more than about one-half) of the resistance to the flow of the heating fluid F2, and for the resistance to the flow of the solar heated fluid F1 to be less (more than about one-half) of the resistance to the service fluid F3.

It is also desirable (for precision control) for the fluid capacity of the exchanger 20 to be minimal consistent with the objective of achieving efficient heat exchange by keeping the heat exchanger surfaces moistened, and for the capacity of the reservoir 43-1 to be considerably greater than that of the hot water storage unit 43-2. In a test embodiment of the invention the capacity of the hot water unit 43-2 was about 40 gallons, while the capacity of the reservoir 43-1 ranged from about 1000 to 2000 gallons, and the capacity of the exchanger 20 was about 12 gallons. In other words, the capacity of the exchanger 20 was about one-fourth that of the hot water unit 43-2 and about one-hundredth to one two-hundredth of the reservoir 43-1.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. An energy transfer system, which comprises
   a heat exchanger;
   a first source of energy for said heat exchanger;
   a second source of energy for said heat exchanger;
   storage means having a capacity exceeding that of said exchanger;
   means for transferring energy from said heat exchanger to said storage means,
   said first source of energy comprises means for applying energy of solar origin to said heat exchanger;
   said energy of solar origin in excess of a prescribed level is radiated into the atmosphere by an auxiliary radiator;
   said heat exchanger is a boiler that is heated by said second source;
   and said boiler has a flue with a motorized, fail-safe damper.

2. A system as defined in claim 1, wherein the applying means comprises a closed loop containing fluid that is heated by solar radiation.

3. A system as defined in claim 1, wherein said second source of energy comprises means for applying energy of fossil fuel origin to said heat exchanger.

4. A system as defined in claim 1, wherein said first source of energy is heated fluid loop that is connected to said heat exchanger by coils in said boiler.

5. A system as defined in claim 4, wherein said coils are in a plurality of parallel paths to lower the resistance to flow of said fluid through said boiler.

6. A system as defined in claim 1, wherein utilization means are included at the output of said storage means.

7. A system as defined in claim 1, wherein utilization means are included in the transferring means.

8. A system as defined in claim 1, wherein primary energy requirements are supplied from said heat exchanger from said second source and secondary energy requirements are supplied from said heat exchanger from said first source or from said storage means.

9. A system as defined in claim 1, wherein said storage means comprises a first storage tank for supplying hot water.

10. A system as defined in claim 1, wherein said storage means comprises a storage tank through which hot water for radiation heating is circulated and heat is transferred from said first source to said tank when the temperature at the exchanger exceeds that at the tank.

11. A system as defined in claim 10, wherein heat is transferred to said tank by pumping liquid from said heat exchanger through the base portion of said tank.

12. A system as defined in claim 1, wherein said storage means comprises a storage tank for supplying hot water and heat is transferred from said second source to said tank when the temperature at said tank falls below a prescribed level.

* * * * *